(12) United States Patent
Brill

(10) Patent No.: US 6,481,957 B1
(45) Date of Patent: Nov. 19, 2002

(54) MODULAR WIND ENERGY DEVICE

(76) Inventor: Bruce I. Brill, Tekoa 952 B, 90908 Northern Judea (IL)

( * ) Notice: Subject to any disclaimer, the term of this patent is extended or adjusted under 35 U.S.C. 154(b) by 0 days.

(21) Appl. No.: 09/807,026

(22) PCT Filed: Oct. 19, 1999

(86) PCT No.: PCT/IL99/00546

§ 371 (c)(1),
(2), (4) Date: Apr. 9, 2001

(87) PCT Pub. No.: WO00/23709

PCT Pub. Date: Apr. 27, 2000

(30) Foreign Application Priority Data

Oct. 20, 1998 (IL) ................................. 126678

(51) Int. Cl.[7] ................................. F03D 3/04
(52) U.S. Cl. ................ 415/4.1; 415/8; 415/126; 415/147; 415/905
(58) Field of Search .................. 415/4.1, 8, 126, 415/146, 147, 905; 416/197 A, DIG. 4, DIG. 9; 290/44, 55

(56) References Cited

U.S. PATENT DOCUMENTS

| | | | |
|---|---|---|---|
| 3,942,909 A | * 3/1976 | Yengst | ................ 416/132 B |
| 4,084,918 A | 4/1978 | Pavlecka | |
| 4,127,356 A | 11/1978 | Murphy | |
| 4,177,009 A | * 12/1979 | Baum, Sr. et al. | ............ 416/45 |
| 4,315,713 A | 2/1982 | Verplanke | |
| 4,715,776 A | * 12/1987 | Benesh | ........................ 415/2 R |
| 5,009,569 A | 4/1991 | Hector | |
| 5,075,564 A | * 12/1991 | Hickey | ........................ 290/55 |
| 5,103,646 A | * 4/1992 | Fini | ........................... 60/698 |
| 5,287,004 A | * 2/1994 | Finley | ........................ 290/55 |

* cited by examiner

Primary Examiner—Edward K. Look
Assistant Examiner—Ninh Nguyen
(74) Attorney, Agent, or Firm—Nixon & Vanderhye P.C.

(57) ABSTRACT

A modular wind energy device for converting wind energy into mechanical energy, which includes a support structure configured for placement onto a support surface (36) and defining an axis of rotation (23) generally parallel thereto; one or more panemone type rotors (16) mounted onto the support structure for free rotation about the axis of rotation, having a pair of wing elements, of which, during rotation of the rotor in response to an airflow, at all times, one of the wing elements faces in an upstream direction and the other of the wing elements faces in a downstream direction; a power take off element associated with the one or more rotors; and shroud apparatus (10) for reducing resistance against the returning wing surfaces, and for directing the airflow toward the effective wing surfaces.

14 Claims, 10 Drawing Sheets

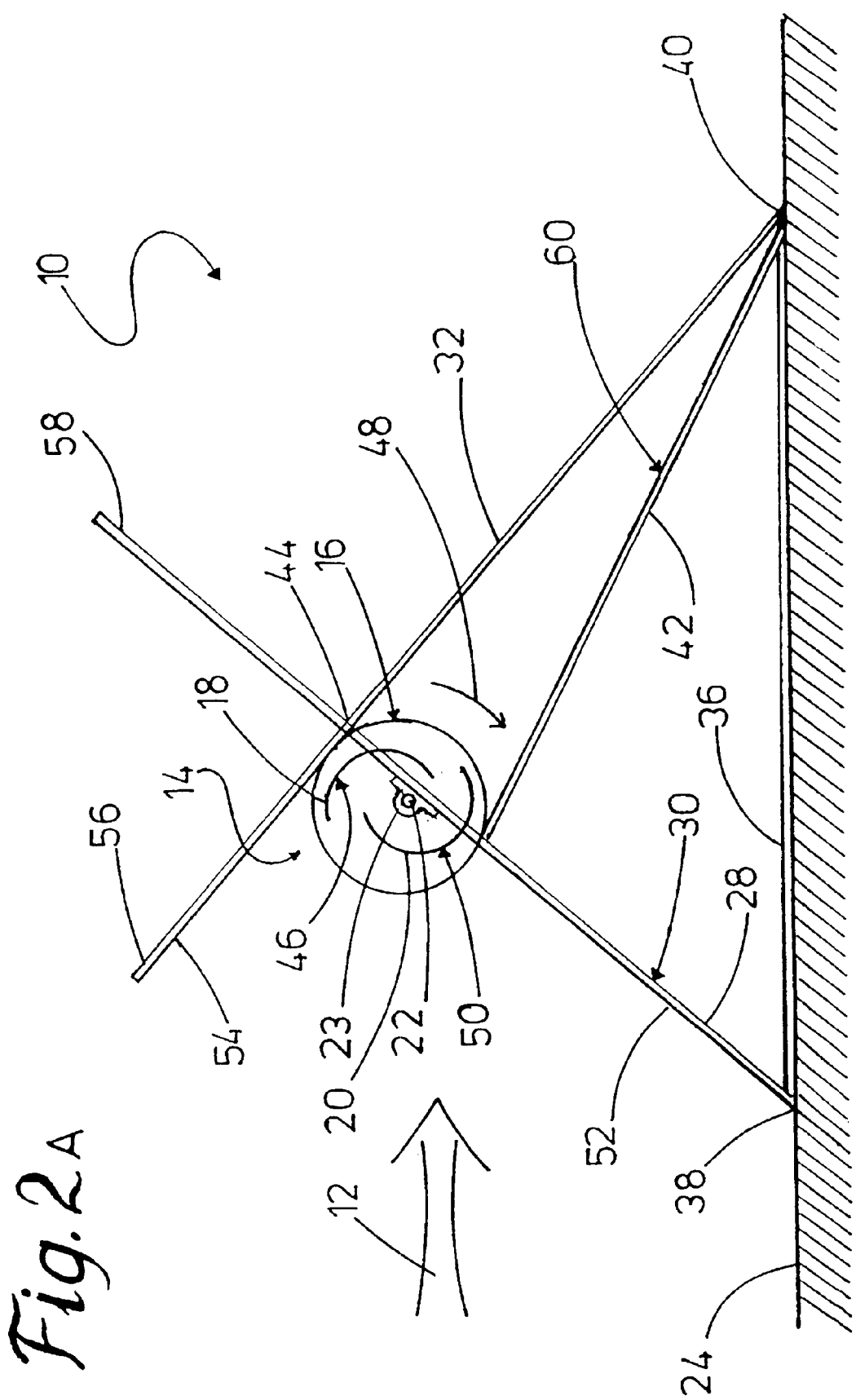

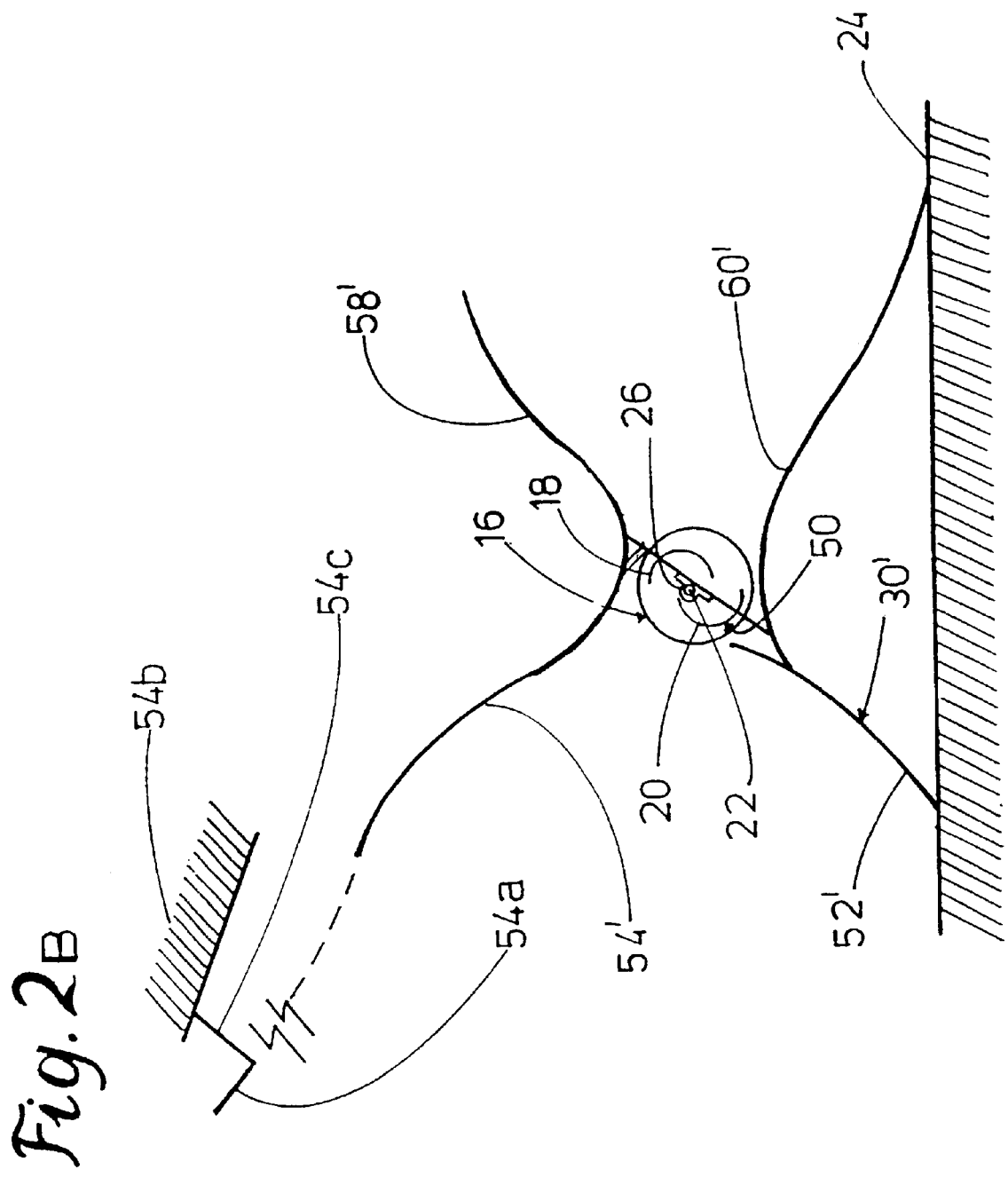

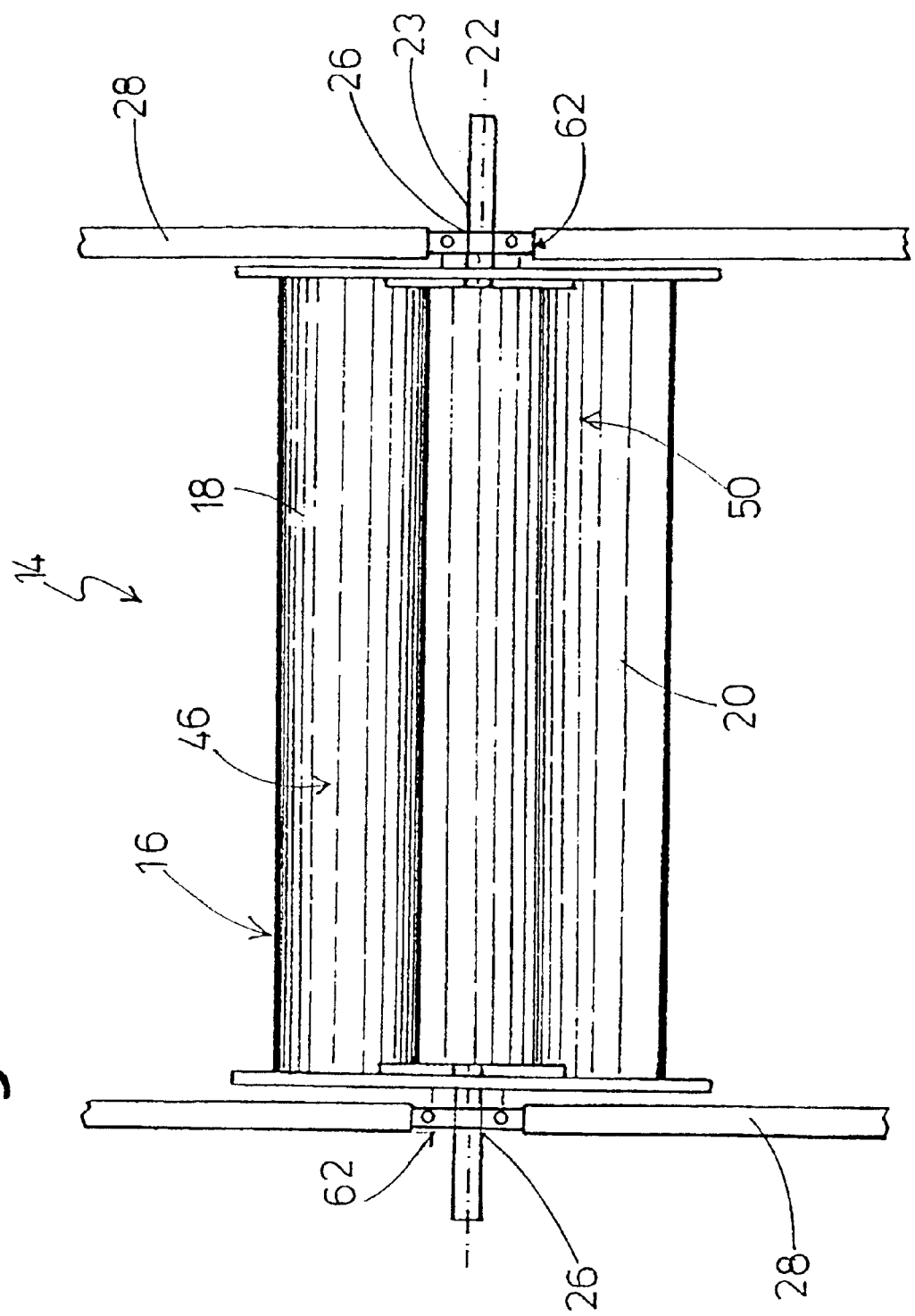

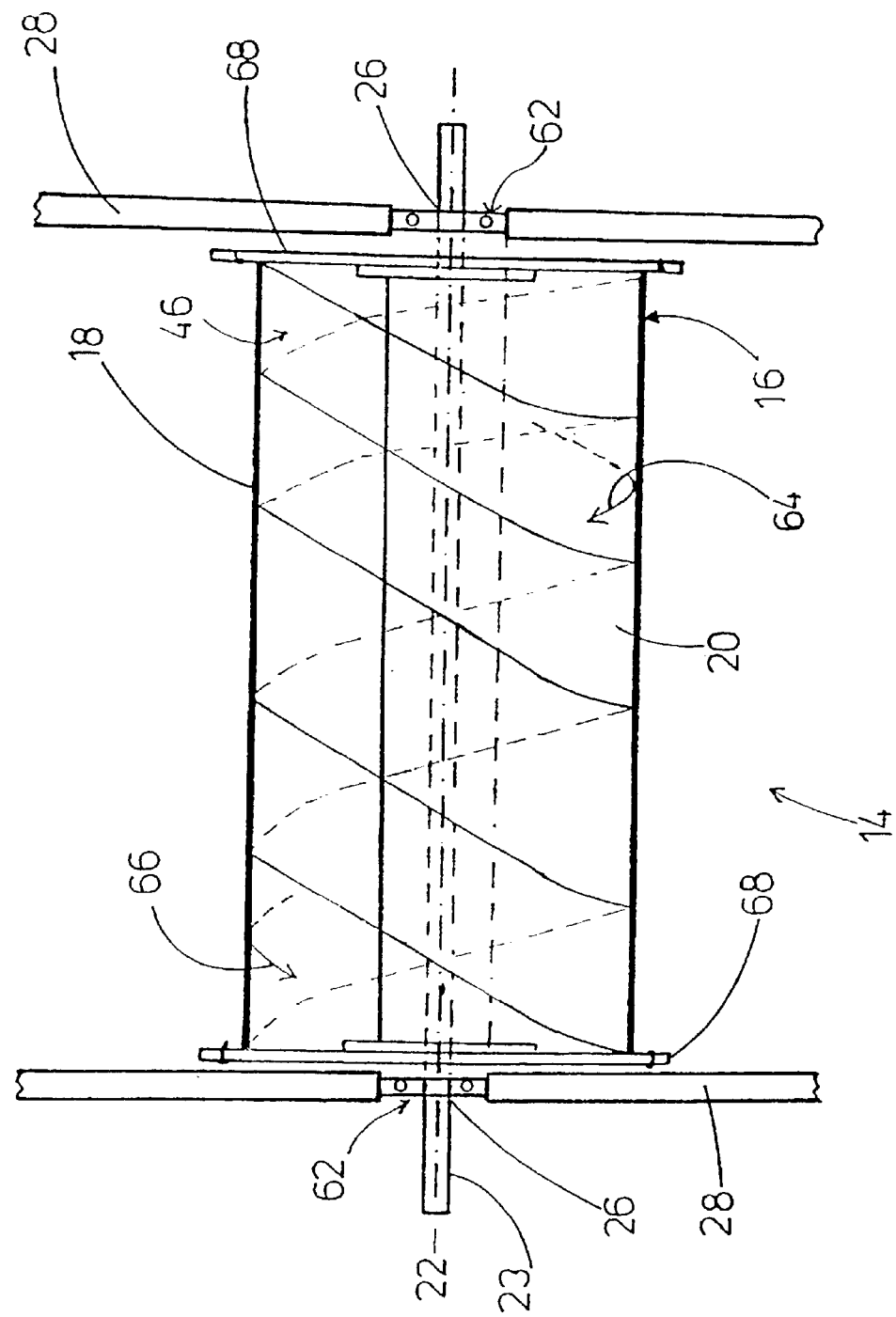

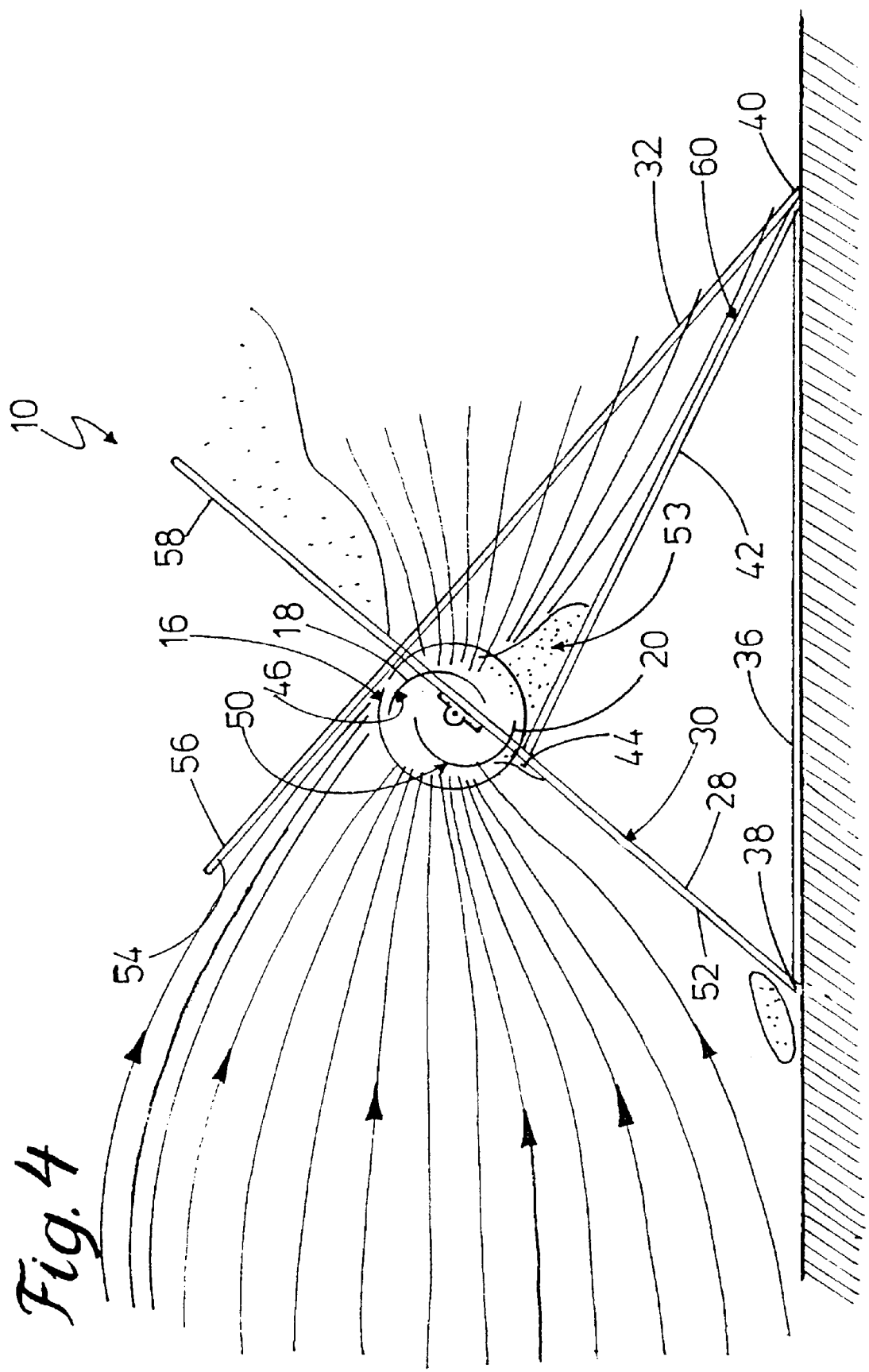

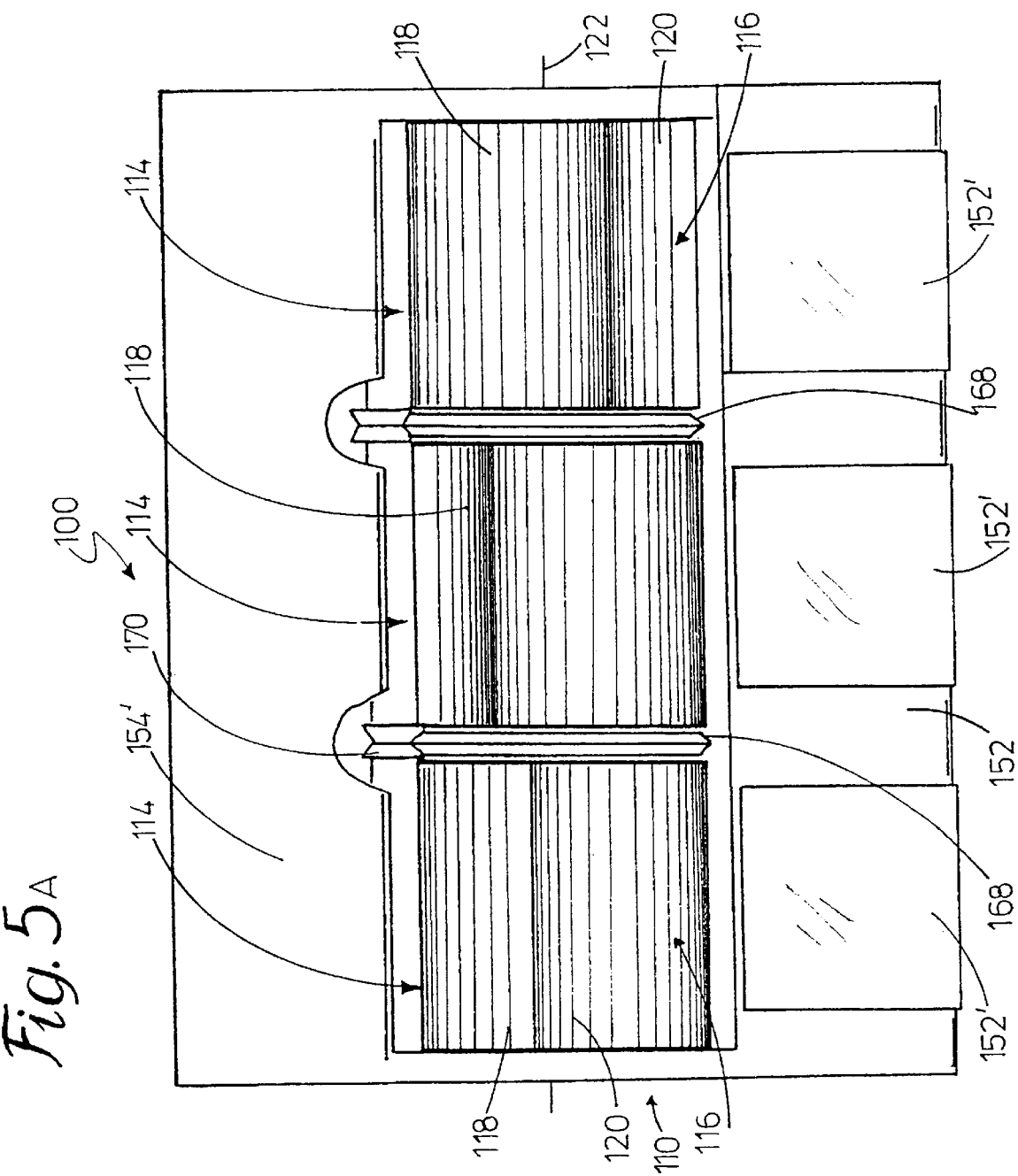

MODULAR WIND ENERGY DEVICE

FIELD OF THE INVENTION

The present invention relates to wind devices, generally, and more particularly, to wind devices for converting wind energy into mechanical energy.

BACKGROUND OF THE INVENTION

Wind devices for converting wind energy into mechanical energy are well known. Such devices employ generated mechanical energy, for example, for generating electricity, compressing air, heating water, and the like.

Known wind machines are of two basic types: (1) those having wings which rotate in a plane perpendicular to the direction of the wind, often referred to as the propeller type, and (2) those whose effective wing surfaces move in the direction of the wind, sometimes referred to as panemones. Paddlewheel rotors, cup-type rotors, open- and closed-S rotors are known examples of panemones.

Propeller type wind machines generally suffer from high initial capital and maintenance costs relative to the power each machine unit can produce. Shrouds, which include an intake section that tapers toward a throat section in which the rotor is housed, have been utilized to increase the power output of these propeller type wind machines by a factor of as much as three. Shrouds, however, have the disadvantage of being cost ineffective due to a number of factors, which include high development and manufacturing costs of three-dimensional, smoothly contoured surfaces and other intricate design features to decrease airflow separation, such as those described in Israeli Patent No. 4892812, and the large size required of these shrouds which complicates tower mounting and, also complicates the ability of the machine unit to face quickly into changing wind directions.

Panemones are usually of simple, low technological design and do not suffer, therefore, from the high initial capital costs associated with propeller type wind machines. Panemones have traditionally been mounted with their shafts perpendicular to the ground to enable them to accept winds from all directions instantly, without having to reorient themselves into the wind as wind direction changes. A major drawback associated with panemones with vertical shafts is the excessive destructive vibrations developed at high rotational velocities. This problem is compounded as the length of the rotor increases, thus substantially limiting the amount of power per machine unit.

SUMMARY OF THE INVENTION

The present invention seeks to provide a modular wind energy device for converting wind energy into mechanical energy, and which overcomes or avoids one or more of the foregoing disadvantages of the known propeller type and limitations of panemone type wind machines, and which meet the requirements of such a modular wind energy device, as more fully set forth herein.

Another object of the present invention is to provide a modular wind energy device of the panemone type which features low initial capital and maintenance costs.

Another object of the present invention is to provide a modular wind energy device of the panemone type whose modularity, i.e., easy addition or subtraction of single rotors, allows a wide power output range per machine unit.

Another object of the present invention is to provide a modular wind energy device of the panemone type having inherent stability which reduces vibration therein, compared with other known types of similar wind energy devices.

Another object of the present invention is to provide a modular wind energy device of the panemone type whose own minimal superstructure eliminates the need for a tower.

There is thus provided, in accordance with a preferred embodiment of the invention, a modular wind energy device for converting wind energy into mechanical energy, which includes:

a support structure configured for placement onto a support surface and defining an axis of rotation generally parallel thereto;

one or more panemone type rotors mounted onto the support structure for free rotation about the axis of rotation, having a pair of wing elements, of which, during rotation of the rotor in response to an airflow, at all times, one of the wing elements faces in an upstream direction and the other of the wing elements faces in a downstream direction;

a power take off element associated with the one or more rotors; and shroud apparatus for reducing resistance against the returning wing surfaces, and for directing the airflow toward the effective wing surfaces.

Additionally in accordance with a preferred embodiment of the present invention, the one or more rotors is a plurality of rotors arranged for rotation along the rotation axis.

Further in accordance with a preferred embodiment of the present invention, the shroud apparatus includes at least a first shroud element extending forwardly of the rotors, and terminating immediately therebefore, thereby to trip a boundary layer thereat so as to provide airflow separation thereat, and thereby to provide a region of relatively still air through which the returning wing surfaces pass.

Additionally in accordance with a preferred embodiment of the present invention, there is also provided at least a second shroud element mounted onto the support structure and in association with the upstream wing element, thereby to direct the airflow towards the effective wing surface thereof.

Further in accordance with a preferred embodiment of the present invention, the second shroud element is a self adjusting element, operative to change position in accordance with the angle of incidence of the airflow.

Additionally in accordance with a preferred embodiment of the present invention, the self-adjusting shroud element has a two-dimensional airfoil profile.

Further in accordance with a preferred embodiment of the present invention, the second shroud element includes an additional forward extension, operative to increase the airflow energy directed to the effective wing surfaces of the wing elements.

Additionally in accordance with a preferred embodiment of the present invention, there is also provided additional energy collection apparatus, such as solar energy collector apparatus.

BRIEF DESCRIPTION OF THE DRAWINGS

The present invention will be more fully understood and appreciated from the following detailed description, taken in conjunction with the drawings, in which:

FIG. 2A is an end view of the device of FIG. 1;

FIG. 2B is an end view of a device similar to that of FIGS. 1 and 2A, but having a more aerodynamically contoured profile;

FIG. 3A is a front view of a single rotor of the device of FIG. 1;

FIG. 3B is a front view similar to that of FIG. 3A, but illustrating additional tension cables used for reinforcing the rotors therein;

FIG. 4 is a diagrammatic side view of the device of FIG. 1, and depicting airflow therethrough;

FIG. 5A is a front, partially cut away view, showing a combined, modular, wind and solar energy system constructed in accordance with an alternative embodiment of the present invention;

DETAILED DESCRIPTION OF THE INVENTION

Figure 1:
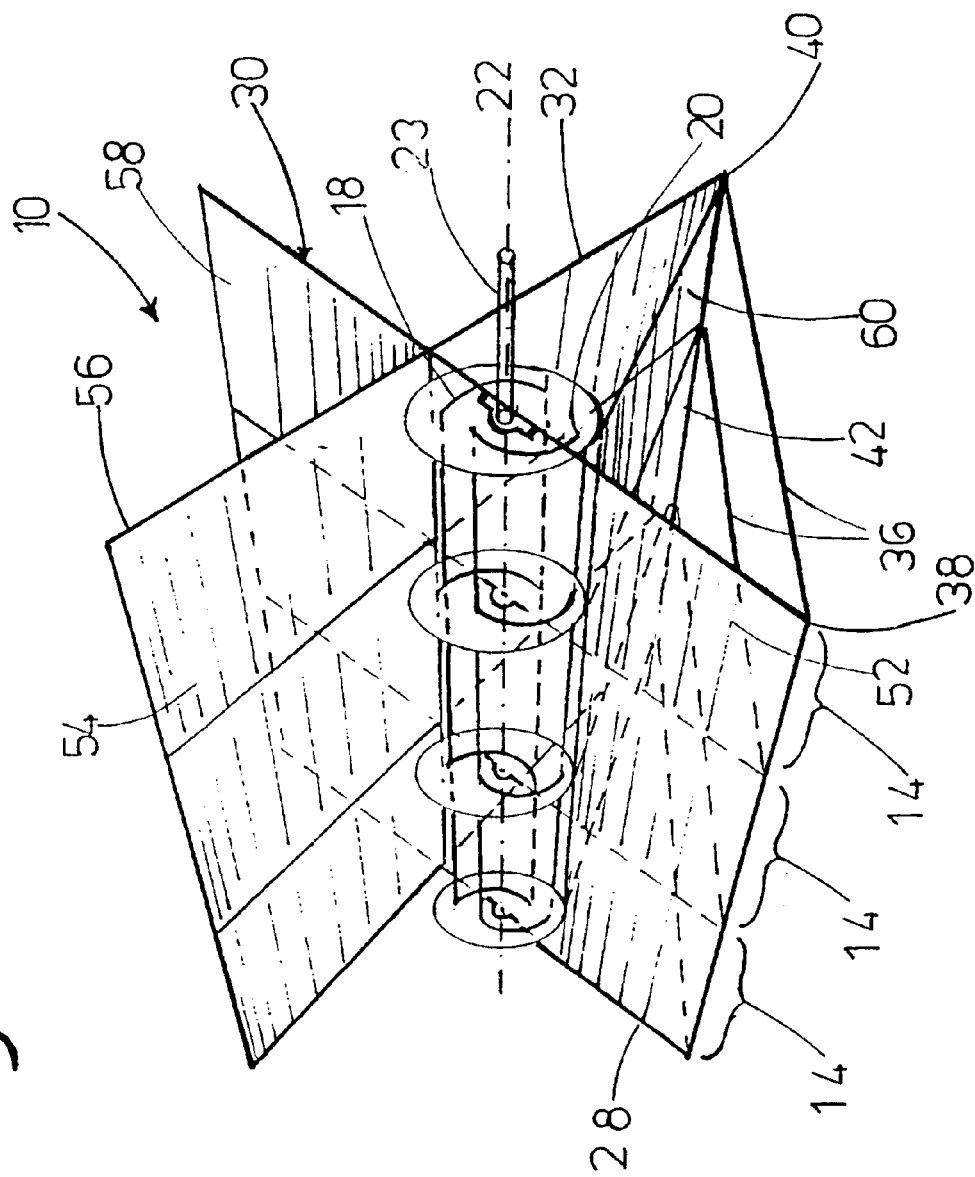
FIG. 1 is a perspective view of a modular wind device for converting wind energy into mechanical energy, and operative in accordance with a preferred embodiment of the present invention.

Referring now to FIGS. 1, 2A, and 4, there is illustrated a modular, panemone type wind energy device, referenced generally 10, for converting wind energy into mechanical energy, constructed and operative in accordance with a preferred embodiment of the present invention. It will be appreciated that the overall structure provides for increased energy output by providing a support structure which is arranged to maximize exposure to wind, while at the same time reducing air resistance to rotation of the panemone rotors and, further, to permit an increase in the overall surface area facing into the wind, while significantly reducing problems of vibration.

By way of clarification, the terms "upstream" and "downstream" are employed with respect to a prevailing wind that is assumed, for purposes of simplicity only, to be coming from the 'front' or left, as viewed in FIG. 2A, and as indicated by an arrow 12. While device 10 is positioned so as to face in an upstream direction, that is, into the prevailing wind, it is also operable when the wind flow comes from the 'rear' or right.

Device 10 thus includes one or more panemone rotor units 14, each having, by way of example, an open-S shaped rotor 16, having first and second wing elements, respectively referenced 18 and 20, which rotate about a common support axis 22. As seen, axis 22 is preferably parallel to a support surface 24. A take-off shaft 23 preferably extends along axis 22, and is operative to be rotated by rotors 16, so as to enable attachment of any suitable rotational energy conversion device, such as an electrical generator or a compressor, for example.

It will be appreciated by persons skilled in the art that, while two wing elements are shown and described herein, this is by way of example only, and three or more wing elements may be provided in accordance with alternative embodiments of the invention.

Referring now also to FIGS. 3A and 3B, each rotor 16 is mounted via suitable bearings 26 onto a pair of parallel, forward members 28 of a support frame, referenced generally 30 (FIGS. 1, 2A, 2B and 4), so as to define support axis 22. Support frame further includes a plurality of cross members 32 which are connected to forward members 28 so as to intersect therewith at locations 44, and, typically, a plurality of ties 36, connecting respective footings 38 and 40, of forward members 28 and cross members 32. Further rearwardly extending diagonal support members 42 may also be provided, extending between locations 44 on forward members 28 and footings 40 of cross members 32.

Rotors 16, it will be appreciated, are thus free to rotate, together with shaft 23, so as to provide a power output in response to a turning force applied thereto by an airflow.

It will thus be appreciated, that an airflow in the direction illustrated in FIGS. 2A and 4, impinges on a face 46, known also as the "effective wing surface," of the first wing element 18, illustrated in an upstream-facing position, so as to apply to rotor 16 a rotational force in a clockwise direction, as illustrated in the drawing, and depicted by an arrow 48. In the absence of suitable shrouding, however, described below, upstream facing returning wing surface 50 of second wing element 20, would also be exposed to the airflow, which would apply thereto an opposing rotational force. While this rotational force would clearly be smaller than that indicated by arrow 48, it would nonetheless serve to reduce the overall power output, and thus the efficiency of the device 10.

Accordingly, in order to reduce this counterclockwise force, generally flat, inclined, first shroud elements 52 are mounted onto the forward members 28 of support frame 30, between locations 44, just beneath rotors 16, and footings 38 of forward members 28.

Referring now particularly to FIG. 4, first shroud elements 52 are operative to trip the crosswise boundary layer profile, thereby providing airflow separation, and the creation of an area of relatively still air at the location through which the returning wing elements pass, illustrated herein as second wing elements 20, defining returning wing surface 50. This area is referenced generally by 53. Above this area of relatively still air, there is created an area of increased air velocity at the location substantially in line with the upstream facing, effective wing surface 46 of the first wing element 18, as seen by the streamlines in FIG. 4.

Additional similar, second shroud elements 54 are mounted on an inclined orientation, onto upper portions 56 of cross members 32, serving to direct the airflow towards the upstream facing, effective wing surface 46 of the first wing element 18.

Yet further, additional, third and fourth similar shroud elements 58 and 60 are mounted onto downstream extensions of forward members 28, and rearwardly extending diagonal support members 42, respectively, These third and fourth shroud elements 58 and 60 serve the purpose of causing airflow separation and direction, respectively, similar to those provided by first and second shroud elements, 52 and 54, with respect to leeward winds, and with the same advantageous improvement in power take off efficiency.

It will also be noted that third shroud element 58 further serves as a diffuser for backed-up air when the airflow into the rotor units 14 is as indicated by arrow 12, as seen in FIG. 2A, thereby creating a zone of reduced pressure between the third and fourth shroud elements 58 and 60, behind rotors 16. This is particularly advantageous in aiding exhaustion of de-energized air from the rotor units 14, and in thus permitting relatively free rotation thereof.

Shroud elements 52, 54, 58 and 60 are preferably formed of elements of a flexible material, and may optionally be provided with ribs, corrugations, or deflectors (not shown) which are arranged substantially perpendicular to the axis 22. Also, as seen in FIG. 2B, in an alternative embodiment of the invention, the shroud elements 52', 54', 58' and 60' may be provided with a more aerodynamically contoured profile as illustrated. The remaining functional elements of the embodiment illustrated in FIG. 2B are similar to those shown and described above in conjunction with FIGS. 1 and 2A, and are thus designated with similar reference numerals, and are not described again specifically, herein.

Referring now particularly to FIG. 2B, it will be appreciated by persons skilled in the art that the length of any shroud element may vary, including considerable increases in the upper sections, illustrated by exemplary extension 54a thereby to increase the amount of wind energy directed to rotor 16. The extension 54a may be formed of any suitable, preferably flexible, sheet material, such as may be suspended by attachment to any suitable fixed support 54b, via a suitable structure, represented schematically by means of a single tie member 54c, by the natural lift of the winds, or by balloons. The extended flexible sheeting and/or the framework upon which it is mounted may be anchored to the ground by tension cables (not shown).

Referring now once more specifically to FIGS. 3A and 3B, it is seen that each bearing 26 includes a housing 62 which supports a portion of shaft 23, which may either be formed of shaft segments linking two adjacent rotors, or may extend through the entire length of the rotor units 14. In addition, as seen in FIG. 3B, the construction of rotor units 14 may also include tension cables 64 and 66, shown by way of illustration as being wound about first and second wing elements, respectively referenced 18 and 20, in a direction opposite to the direction in which torsional twist is developed in the rotor. The tension cables 64 and 66 are wound between rotor end discs 68, and around the wing elements in such a manner as to transfer power along the length of the rotor wings 18 and 20, and at the same time so as to reinforce them. In the illustrated embodiment, torsion twist results from torque transferal from the right side of the rotor 16 and power extraction to the left.

A major advantage of the above-described wind device is that any desired number of rotor units 14, together with the attendant support structure, may be combined in a single device, thereby to receive a net increase in derived power. This is due to the fact that, as the device is configured for generally horizontal positioning on any suitable support surface, vibrations, such as those normally associated with tall wind energy structures, are minimized, regardless of the number of rotor units employed.

It will be appreciated by persons skilled in the art that a number of significant advantages accrue from the generally horizontal, panemone-type device of the present invention.

Among these advantages are the fact that, due to the above-described performance improvement features, it has been found by the Inventor that the cut-in wind speed is minimized, and may even be less than 3 m/s in well-balanced rotors.

A further advantage is the fact that the present invention provides minimal noise pollution.

Figure 5B:
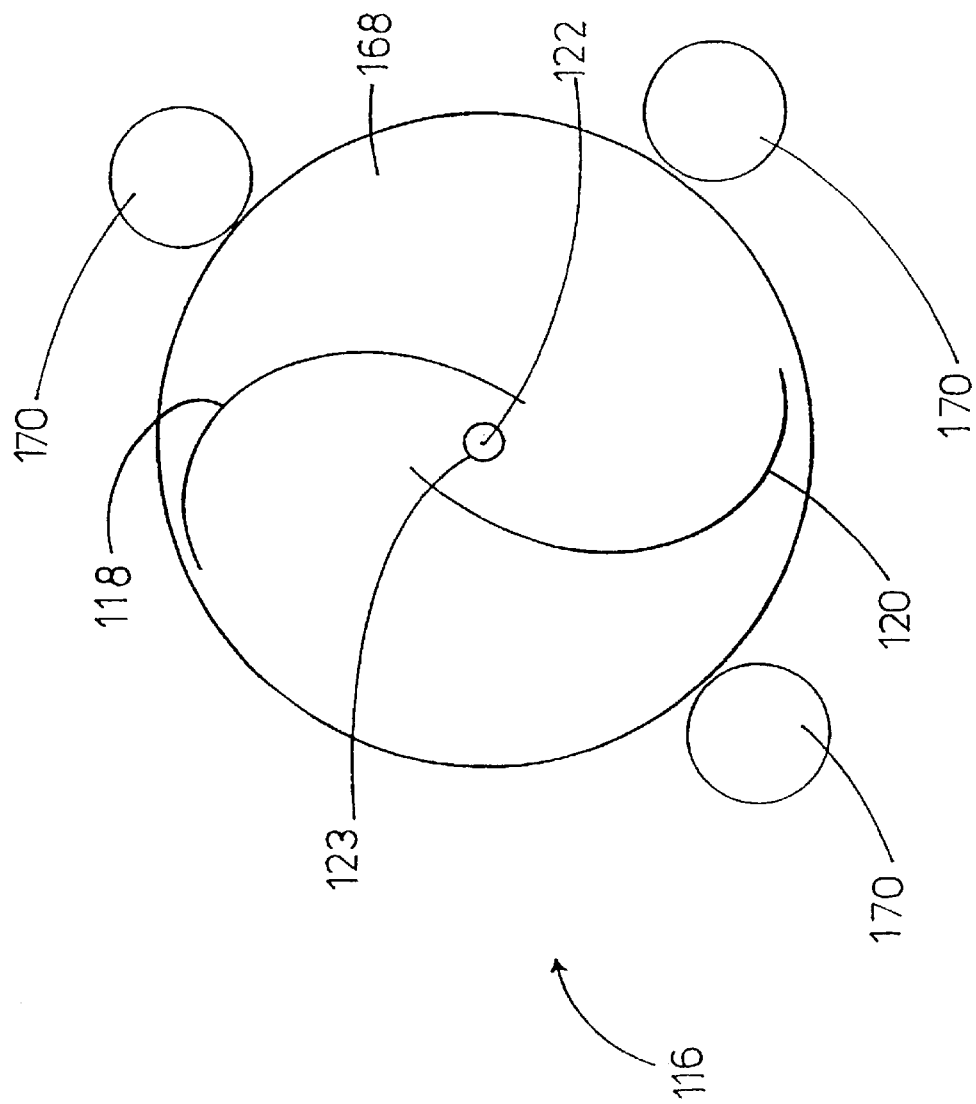
FIG. 5B is a schematic cross-sectional view of a rotor of the system of FIG. 5A, illustrating an alternative external mounting thereof.

Referring now to FIGS. 5A and 5B, there is shown, in accordance with an alternative embodiment of the invention, a combined, modular, wind and solar energy system, referenced generally 100. System 100 includes a wind energy device 110 which is generally similar to that shown and described above on conjunction with FIGS. 1–4, and is thus not specifically described again herein, except with respect to differences between the present device 110 and above-described device 10. Similarly, all portions of the present embodiment having counterpart portions in the above-described device 10, are denoted by similar reference numerals, but with the addition of the prefix "1".

In the present embodiment, rotors 116 of device 110 are supported for rotation about a central axis 122, by means of a plurality of end discs 168, which rotate within an arrangement of a plurality of rollers 170, typically three, of which a single one only, is seen in FIG. 5A, and which are arranged parallel to axis 122. Power take off is provided either by a power take off shaft 123, illustrated in FIG. 5B, or by coupling of one or more of the rollers 170 to a suitable, drivable device (not shown).

As seen in FIG. 5A, first shroud element 152, mounted onto the forward members (not shown) of the support frame (not shown), may optionally be constituted by, or have mounted thereon, solar collector panels 152', whose power output (not shown) can be used to suitably augment the power output from wind device 110.

In the present embodiment, as in the embodiment of device 10 (FIGS. 1–4) any desired number of rotor units 114 may be employed, together with a corresponding number of solar collector panels 152', thereby to proportionately increase the overall power generated by system 100.

Figure 6:
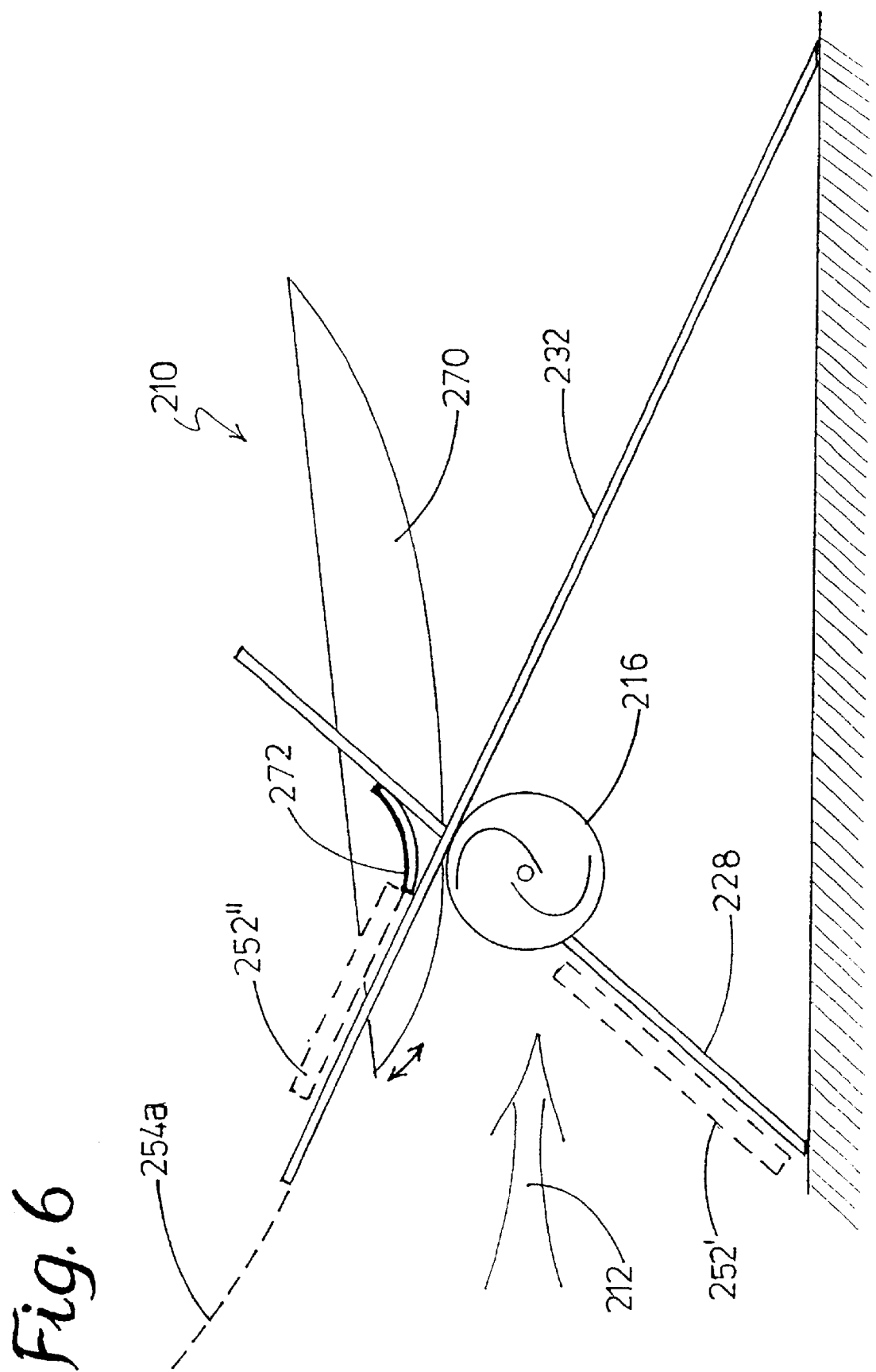
FIG. 6 is a schematic side view of a system similar to that depicted in FIG. 5A, but including a self-adjusting shroud member, depicted herein as a two-dimensional airfoil, in accordance with yet a further embodiment of the invention.
Figure 7:
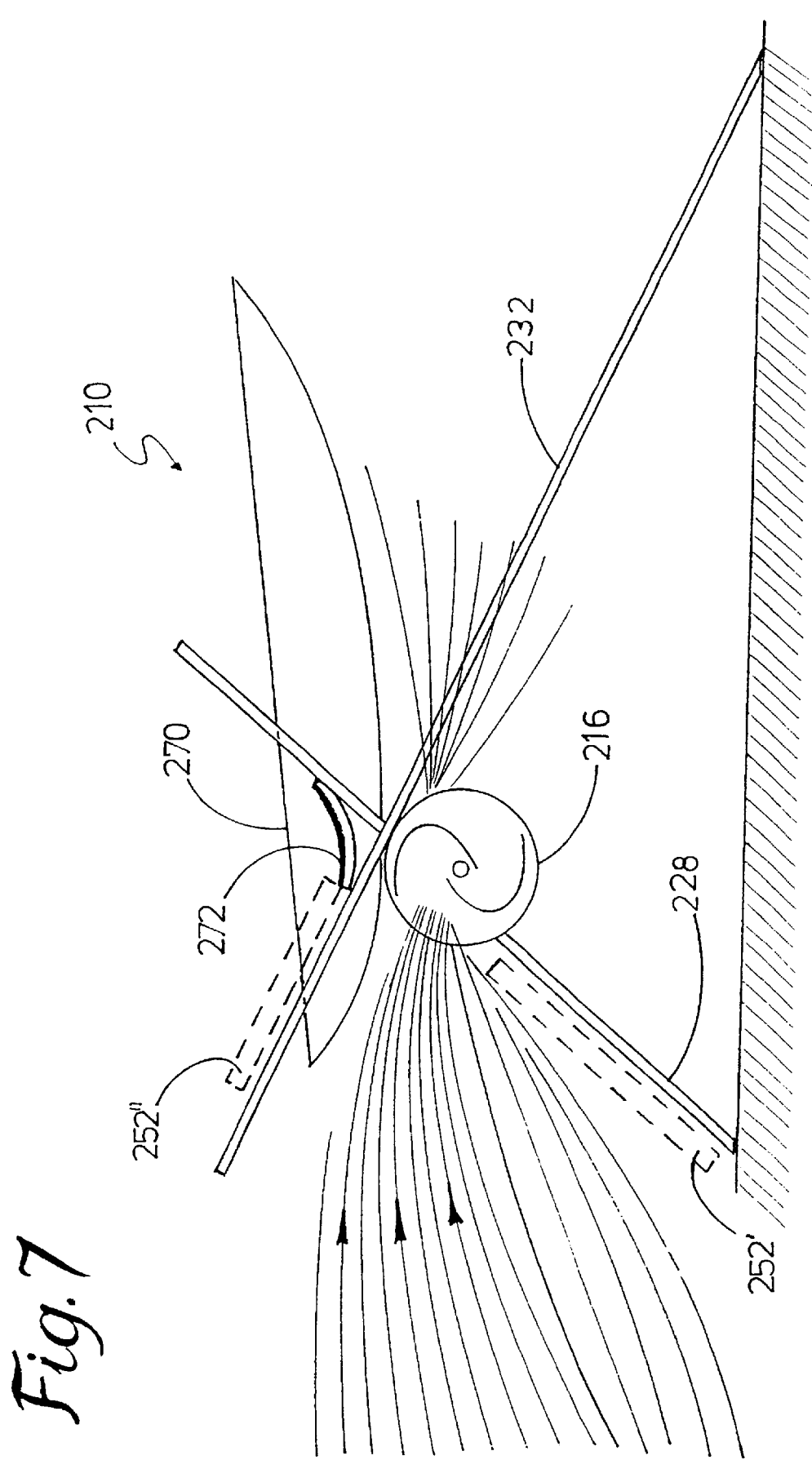
FIG. 7 is a diagrammatic side view similar to FIG. 6, but depicting airflow through the illustrated device.

Referring now to FIGS. 6 and 7, there is shown, in accordance with an alternative embodiment of the invention, a wind device, referenced 210, which is generally similar to that shown and described above in conjunction with any of FIGS. 1–5B, and is thus not specifically described again herein, except with respect to differences between the present device 210 and those described above. Similarly, all portions of the present embodiment having counterpart portions in the above-described devices, are denoted by similar reference numerals, but with the addition of the prefix "2".

While in the above embodiments of the wind device, the upper shroud elements, referenced 54 and 58 in FIG. 4, for example, are fixed, in the present embodiment these elements are replaced by a self adjusting shroud element, referenced 270. Shroud element 270 has a two-dimensional airfoil profile, as clearly seen in the drawings, and is mounted by any suitable means, such as via suitable bearings (not shown) on a track portion 272 mounted between diagonal member 232 and a rear extension of forward facing member 228, thereby rendering said shroud element 270 self-adjustable. The aerodynamic properties and self-adjustment of shroud element 270, when mounted on roller track 272, provide for a change in position in accordance with wind strength and the angle of incidence of the airflow, and, in the presence of a wind flow coming from the front, as indicated by arrow 212, the aerodynamic advantages of the shroud elements, as described above in conjunction with FIGS. 1–4, are optimized, providing a required balance between diversion of incoming wind energy into the throat of the wind device 210, and providing a low pressure area just to the rear thereof. Optionally, there may also be provided solar collector panels 252', as in the hybrid system 100 of FIG. 5A. Solar panels could also, or alternatively be mounted onto any other selected portion of the support structure, as illustrated at 252".

It will be appreciated by persons skilled in the art that the scope of the present invention is not limited to what has been specifically shown and described herein, merely by way of example. Rather, the scope of the invention is limited solely by the claims, which follow.

What is claimed is:

1. A modular wind energy device for converting wind energy into mechanical energy placement, which includes:
   a support structure configured for placement onto a support surface and defining an axis of rotation generally parallel thereto;
   at least one panemone type rotor mounted onto said support structure for free rotation about said axis of rotation, first and second wing elements, each of which defines an effective wing surface arranged to be impacted by an airflow, and a returning wing surface;
   a power take off element associated with said at least one rotor; and
   shroud apparatus for reducing resistance against said returning wing surfaces, and for directing the airflow toward said effective wing surfaces,
   wherein said shroud apparatus includes at least a first shroud element extending forwardly of said at least one rotor, and terminating immediately there before, thereby to trip a boundary layer thereat so as to provide airflow separation thereat, and thereby to provide a region of relatively still air through which said returning wing surfaces pass;
   wherein said shroud apparatus also includes at least a second shroud element mounted onto said support structure forwardly of said at least one rotor and in association with said upstream wing element, thereby to direct the airflow towards said effective wing surface thereof;
   and wherein said second shroud element includes an additional forward extension, operative to increase the airflow energy directed to said effective wing surfaces of said wing elements.

2. A modular wind energy device according to claim 1, wherein said at least one rotor includes a plurality of rotors arranged for rotation along said rotation axis.

3. A modular wind energy device according to claim 1, wherein said second shroud element is a self adjusting element, operative to change position in accordance with the angle of incidence of the airflow.

4. A modular wind energy device according to claim 1, wherein said second shroud element has a two-dimensional airfoil profile.

5. A modular wind energy device according to claim 1, also including additional energy collection apparatus in conjunction therewith.

6. A modular wind energy device according to claim 5, wherein said additional energy collection apparatus includes solar energy collector apparatus.

7. A modular wind energy device according to claim 6, wherein said solar energy collector apparatus includes flat panel solar collectors.

8. A modular wind energy device for converting wind energy into mechanical energy placement, which includes:
   a support structure configured for placement onto a support surface and defining an axis of rotation generally parallel thereto;
   at least one panemone type rotor mounted onto said support structure for free rotation about said axis of rotation, first and second wing elements, each of which defines an effective wing surface arranged to be impacted by an airflow, and a returning wing surface;
   a power take off element associated with said at least one rotor; and
   shroud apparatus for reducing resistance against said returning wing surfaces, and for directing the airflow toward said effective wing surfaces,
   wherein said shroud apparatus includes at least a first shroud element extending forwardly of said at least one rotor, and terminating immediately therebefore, thereby to trip a boundary layer thereat so as to provide airflow separation thereat, and thereby to provide a region of relatively still air through which said returning wing surfaces pass;
   wherein said shroud apparatus includes at least a second shroud element mounted onto said support structure forwardly of said at least one rotor and in association with said upstream wing element, thereby to direct the airflow towards said effective wing surface thereof;
   and wherein said second shroud element is a self adjusting element, operative to change position in accordance with the angle of incidence of the airflow.

9. A modular wind energy device according to claim 8, wherein said at least one rotor includes a plurality of rotors arranged for rotation along said rotation axis.

10. A modular wind energy device according to claim 8, wherein said second shroud element has a two-dimensional airfoil profile.

11. A modular wind energy device according to claim 8, wherein said second shroud element includes an additional forward extension, operative to increase the airflow energy directed to said effective wing surfaces of said wing elements.

12. A modular wind energy device according to claim 8, also including additional energy collection apparatus in conjunction therewith.

13. A modular wind energy device according to claim 12, wherein said additional energy collection apparatus includes solar energy collector apparatus.

14. A modular wind energy device according to claim 13, wherein said solar energy collector apparatus includes flat panel solar collectors.

* * * * *